United States Patent
Collins et al.

[19]

[11] Patent Number: 6,130,521
[45] Date of Patent: Oct. 10, 2000

[54] CONVERTIBLE DESK-TO-WALL SUPPORT AND CHARGING DEVICE FOR HANDHELD RADIOTELEPHONES

[75] Inventors: Christopher Todd Collins, Cary; Charles Hunt, Raleigh, both of N.C.

[73] Assignee: Ericsson Inc., Research Triangle Park, N.C.

[21] Appl. No.: 09/458,936

[22] Filed: Dec. 10, 1999

[51] Int. Cl.[7] .............................. H02I 7/00; A47G 7/10; H04M 1/00

[52] U.S. Cl. ...................... 320/115; 320/107; D13/108; 248/126; 379/454

[58] Field of Search ...................... 320/107, 114, 320/115, 116; D13/107, 108, 109; 248/126, 136, 207, 346.01; 211/87.01, 119.012; 379/454, 435

[56] References Cited

U.S. PATENT DOCUMENTS

| | | | |
|---|---|---|---|
| 4,515,998 | 5/1985 | Pinede et al. | 179/146 R |
| 5,519,776 | 5/1996 | Kodama | 379/435 |
| 5,687,234 | 11/1997 | Chang | 379/454 |

*Primary Examiner*—Peter S. Wong
*Assistant Examiner*—Gregory J. Toatley
*Attorney, Agent, or Firm*—Myers Bigel Sibley & Sajovec, P.A.

[57] ABSTRACT

Charging devices for handheld radiotelephones, are provided that are convertible between a desk mounted configuration and a wall mounted configuration. A charging device includes a wedge-shaped lower housing portion and a wedge-shaped upper housing portion that can be rotated relative to each other. A cradle is disposed within the upper housing portion that is configured to support a radiotelephone. The lower and upper housing portions are adapted to be matingly secured together in a first orientation relative to one another so that a radiotelephone is maintained in an upright position when a charging device is supported by a horizontal surface, such as a desktop. In addition, the lower and upper housing portions are adapted to be matingly secured together in a second orientation relative to one another so that a radiotelephone is maintained in an upright position when a charging device is supported by a vertical surface, such as a wall.

17 Claims, 5 Drawing Sheets

CONVERTIBLE DESK-TO-WALL SUPPORT AND CHARGING DEVICE FOR HANDHELD RADIOTELEPHONES

FIELD OF THE INVENTION

The present invention relates generally to portable electronic devices and, more particularly, to devices for re-charging batteries within portable electronic devices.

BACKGROUND OF THE INVENTION

Portable telecommunications devices, such as handheld radiotelephones (e.g., cellular telephones), have become increasingly popular for both personal and commercial use. With their increase in popularity, handheld radiotelephones have also been undergoing miniaturization to facilitate storage and portability. Indeed, some contemporary radiotelephone models are only 9–12 centimeters in length.

Handheld radiotelephones typically utilize rechargeable batteries for supplying operational power thereto. Devices for recharging batteries from an alternating current (AC) power source are well known. An exemplary charging device for recharging batteries within a handheld radiotelephone is described in U.S. Pat. No. 5,687,234 to Chang.

Increasingly, handheld radiotelephones are being equipped with features once reserved for desktop telephones. For example, radiotelephones are being equipped with speaker phone features that allow "hands-free" operation. Accordingly, there is a need to support radiotelephones on a desktop, wall or other surface to facilitate hands-free operation. In addition, it would be desirable to recharge the batteries within a radiotelephone when the radiotelephone is supported for hands-free operation. Unfortunately, charging devices designed for desktop support of a radiotelephone may be ill-suited for supporting a radiotelephone on a wall or other non-horizontal surface.

SUMMARY OF THE INVENTION

In view of the above, it is an object of the present invention to provide devices for recharging handheld radiotelephones and other portable electronic devices that can be utilized on a desktop, or other horizontal surface, and that can be easily converted for use on a wall or other non-horizontal surface.

It is another object of the present invention to provide recharging devices that can support radiotelephones for hands-free operation on a desktop and on a wall or other non-horizontal surface.

These and other objects of the present invention are provided by a charging device for a portable, wireless communications device, such as a handheld radiotelephone, that is convertible between a desk mounted configuration and a wall mounted configuration. The charging device includes a wedge-shaped lower housing portion and a wedge-shaped upper housing portion that can be rotated relative to each other. The lower housing portion includes a bottom wall and opposite first and second walls extending upwardly from the bottom wall.

The upper housing portion includes a front wall and opposite third and fourth walls extending rearwardly from the front wall. A cradle is disposed within the front wall between the third and fourth walls and is adapted to support a radiotelephone in an upright position.

The lower and upper housing portions are adapted to be matingly secured together in a first orientation relative to one another when the bottom wall is supported by a horizontal surface, such as a desktop. In the first orientation, a radiotelephone disposed within the cradle can be maintained at an inclined angle of between about thirty degrees and ninety degrees (30°–90°) relative to horizontal. In addition, the lower and upper housing portions are adapted to be matingly secured together in a second orientation relative to one another when the bottom wall is supported by a vertical, or substantially vertical, surface, such as a wall. In the second orientation, a radiotelephone disposed within the cradle can be is maintained at an inclined angle of between about thirty degrees and ninety degrees (30°–90°) relative to horizontal.

A first electrical terminal adapted to receive electrical power from an external power source can be disposed within a rear wall of the lower housing portion. A second electrical terminal is provided within the cradle and is adapted to matingly engage with an electrical terminal in a radiotelephone supported within the cradle. An internal, flexible electrical cable electrically connects the first and second electrical terminals. The flexible cable permits the lower and upper housing portions to be rotated with respect to each other while maintaining an electrical connection between the first and second electrical terminals.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

Figure 1:
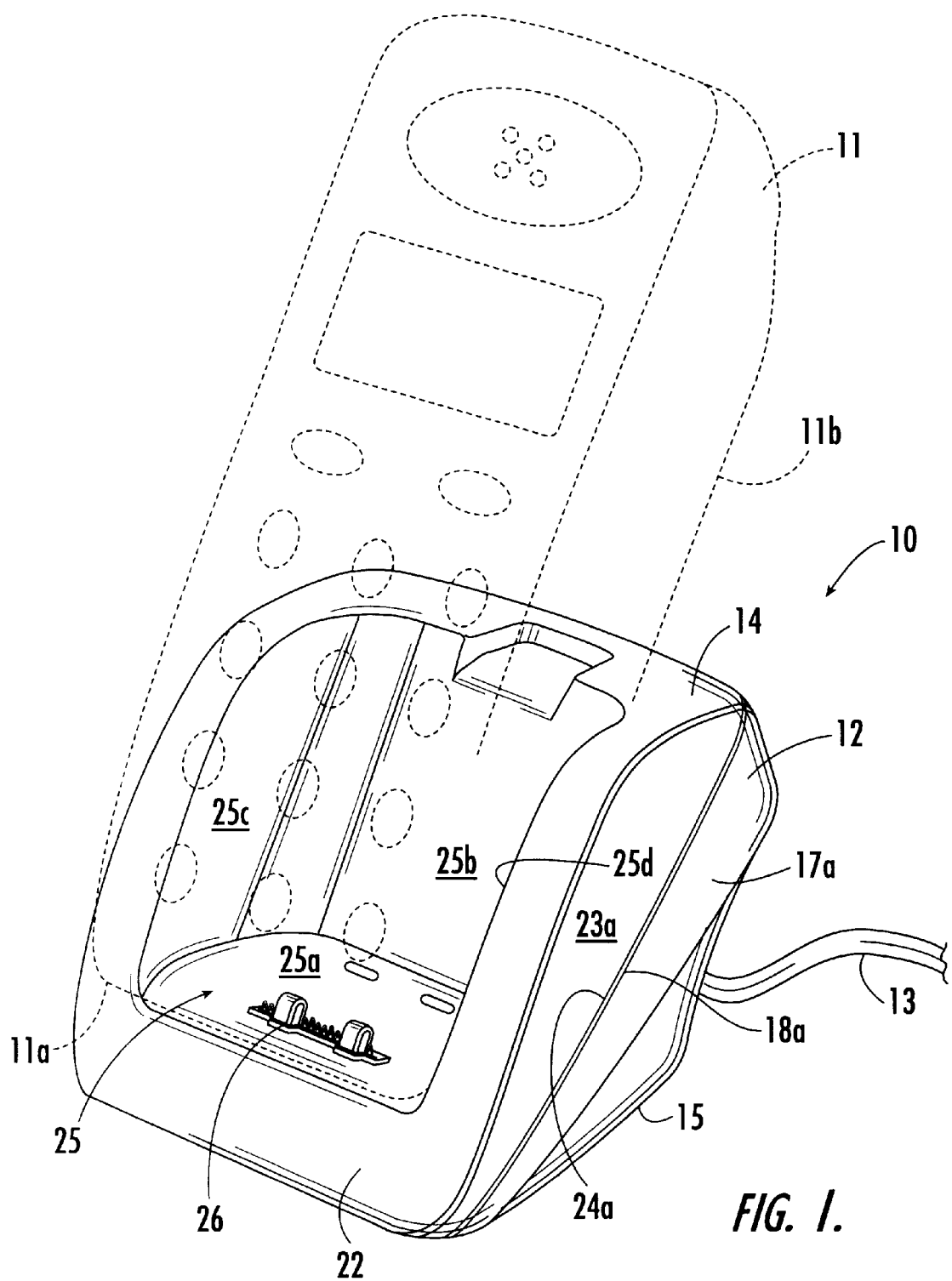
FIG. 1 is a perspective view of a charging device for a radiotelephone, according to an embodiment of the present invention, wherein the charging device is in a first configuration as a desktop mounted device; a radiotelephone is illustrated in phantom line.
Figure 2:
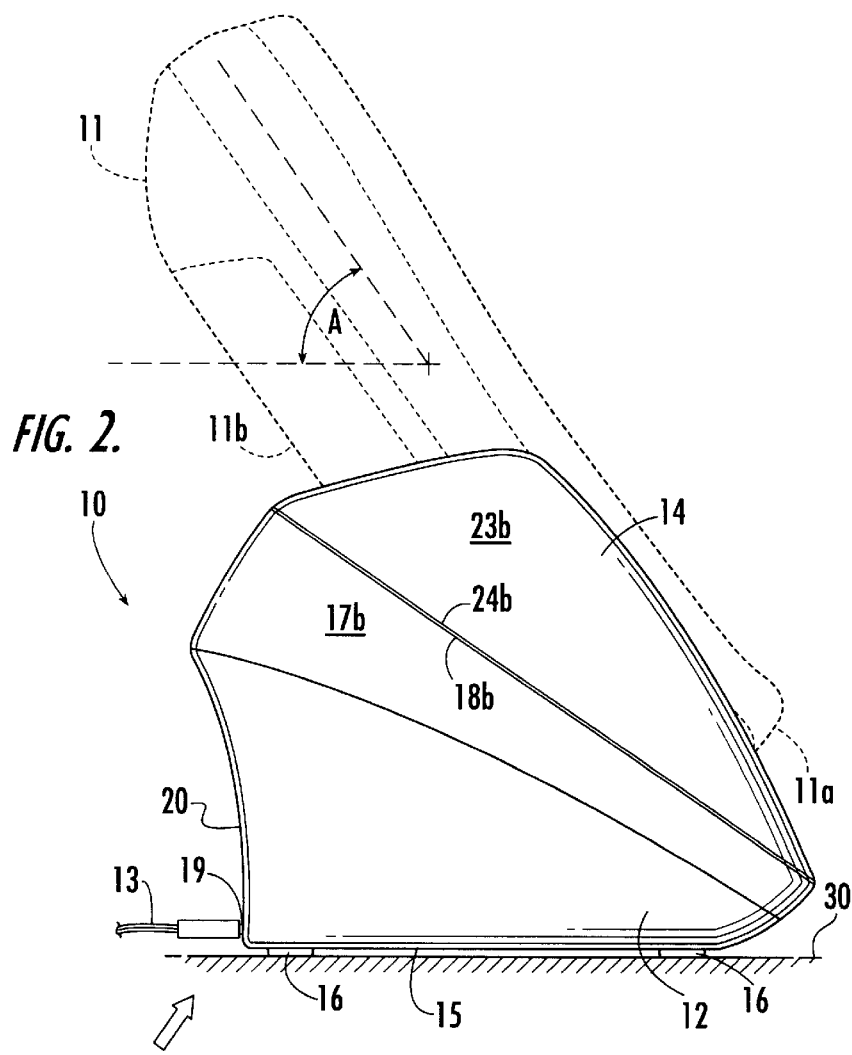
FIG. 2 is a side view of the charging device of FIG. 1.

Referring now to FIGS. 1 and 2, a charging device 10 according to an embodiment of the present invention is illustrated. The charging device 10 is configured to support a portable, wireless communications device, such as a handheld radiotelephone 11, and to recharge one or more internal batteries of the wireless communications device. As will be described in detail below, the charging device 10 is configured to be supported on a horizontal surface, such as a desktop, and on a vertical surface, such as a wall.

The illustrated charging device 10 includes a wedge-shaped lower housing portion 12 and a wedge-shaped upper housing portion 14, each of which are preferably formed from non-conductive material. The lower housing portion 12 includes a bottom wall 15. In the illustrated embodiment, a plurality of support pads 16 (FIG. 2) are secured to the bottom wall 15. Preferably, the support pads 16 are formed from flexible material so as to reduce the transmission of vibrations from a support surface (either vertical or horizontal) to the charging device 10, and to provide friction against slipping, as would be understood by one of skill in the art.

The illustrated lower housing portion 12 includes opposite first and second walls 17a, 17b that extend upwardly from the bottom wall 15. The first and second walls 17a, 17b include respective first and second edges 18a, 18b that slope away from the bottom wall 15, as illustrated. An electrical terminal 19 is disposed within a rear wall 20 of the lower housing portion 12 (FIG. 1). The electrical terminal 19 is adapted to receive electrical power from an external power source via a cable 13 as would be understood by one skilled in the art.

The upper housing portion 14 includes a front wall 22 and opposite third and fourth walls 23a, 23b that extend rearwardly from the front wall 22, as illustrated. The third and fourth walls 23a, 23b include respective third and fourth edges 24a, 24b, as illustrated. A cradle 25 is disposed within the front wall 22 between the third and fourth walls 23a, 23b, as illustrated. The illustrated cradle 25 includes a floor 25a, a back wall 25b, and side walls 25c, 25d. However, the cradle 25 may have various shapes and configurations, and is not limited to the illustrated embodiment. The illustrated cradle 25 is adapted to support a radiotelephone 11 in an upright position. In the illustrated embodiment, one end 11a of the radiotelephone 11 is supported by the cradle floor 25a and the rear portion 11b of the radiotelephone 11 rests against the cradle back wall 25b.

The illustrated cradle 25 includes an electrical terminal 26 that is electrically connected to the electrical terminal 19 disposed within the rear wall 20 of the lower housing portion 12. The electrical terminal 26 is adapted to matingly engage with an electrical terminal (not shown) in the radiotelephone end 11a supported by the cradle floor 25a. Electrical power is thereby provided to one or more internal batteries via the electrical terminal 26.

Figure 3:
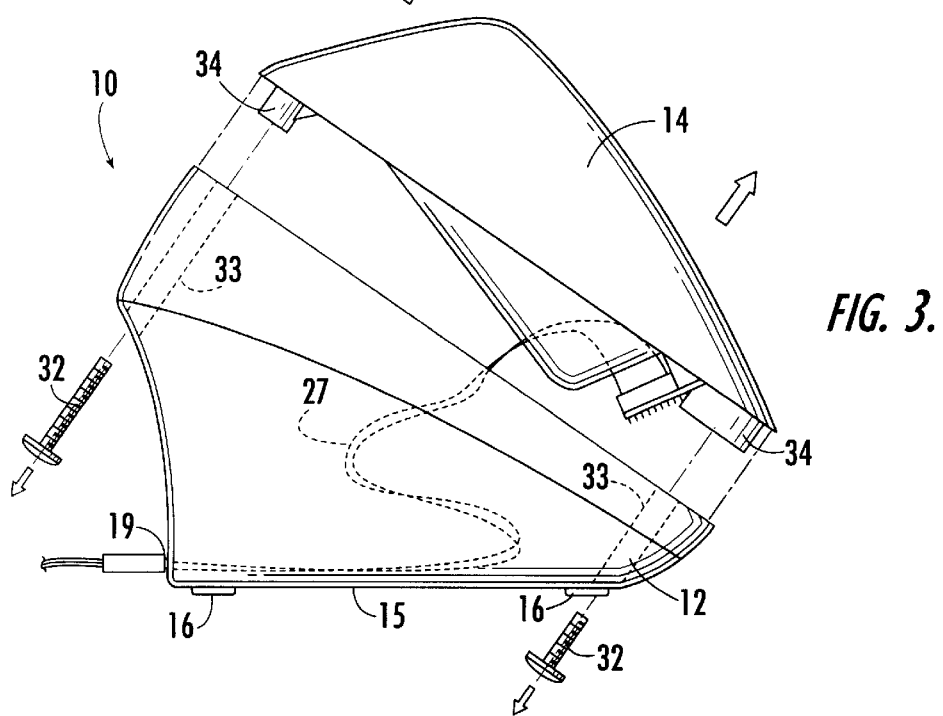
FIG. 3 is an exploded side view of the charging device of FIG. 1 illustrating the upper housing portion being lifted up and away from the lower housing portion.

Preferably, an internal, flexible electrical cable 27 electrically connects the electrical terminals 19 and 26 together, as illustrated in FIG. 3. The flexible cable 27 permits the lower and upper housing portions 12, 14 to be rotated with respect to each other, as described in detail below, while maintaining the electrical connection between the electrical terminals 19 and 26.

Figure 6:
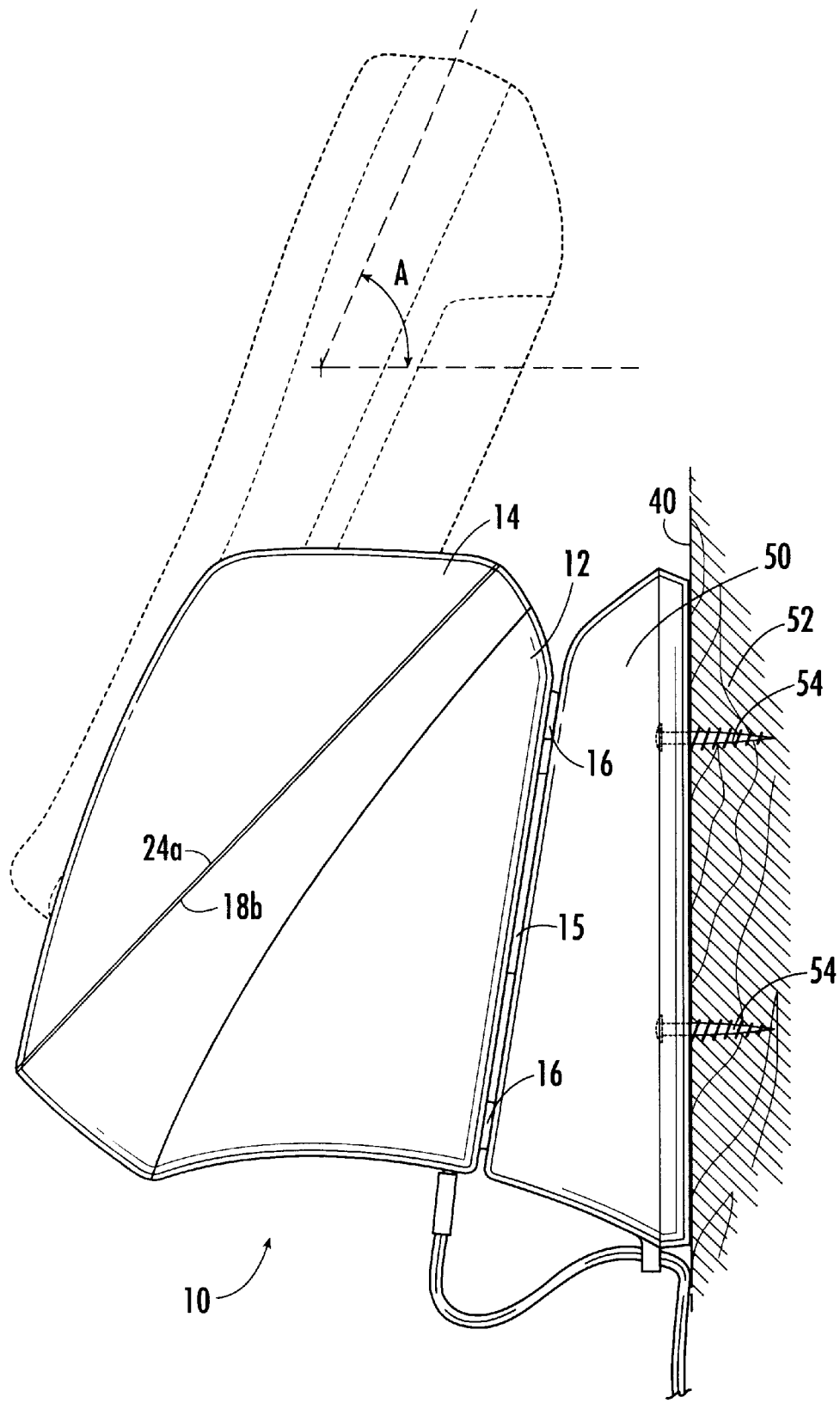
FIG. 6 is a side view of the charging device of FIG. 5 mounted to a wall via a support bracket.

The lower and upper housing portions 12, 14 are adapted to be matingly secured together in a first orientation relative to one another when the bottom wall 15 is supported by a horizontal surface 30, such as a desktop. In the first orientation, a radiotelephone 11 disposed within the cradle 25 can be maintained at an inclined angle A of between about thirty degrees and ninety degrees (30°–90°) relative to horizontal (FIG. 2). In addition, the lower and upper housing portions 12, 14 are adapted to be matingly secured together in a second orientation relative to one another when the bottom wall 15 is supported by a vertical, or substantially vertical, surface 40, such as a wall (FIG. 6). In the second orientation, a radiotelephone 11 disposed within the cradle 25 can be maintained at an inclined angle A of between about thirty degrees and ninety degrees (30°–90°) relative to horizontal as illustrated in FIG. 6. It is preferred that a radiotelephone is supported within the cradle 25 of the charging device 10 at approximately the same angle relative to horizontal in both the first and second orientations. However, a radiotelephone, or other electronic device, supported within the charging device 10 according to the present invention need not be supported at approximately the same angle relative to horizontal in both the first and second orientations.

Figure 5:
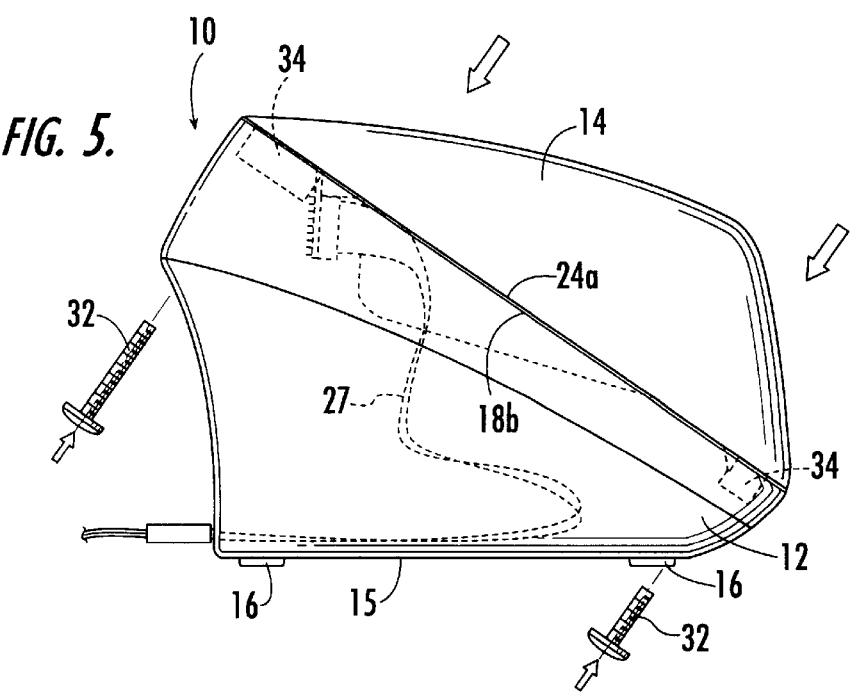
FIG. 5 is a side view of the charging device of FIG. 1 in a second configuration wherein the upper housing portion has been rotated 180° relative to the lower housing portion about an axis normal to the bottom wall of the lower housing portion.

When the lower and upper housing portions 12, 14 are matingly secured together in the first orientation, the first and third edges 18a, 24a of the lower and upper housing portions 12, 14, respectively, are in contacting relationship with each other (FIG. 1), and the second and fourth edges 18b, 24b of the lower and upper housing portions 12, 14, respectively, are in contacting relationship with each other (FIG. 2). Referring now to FIG. 5, when the lower and upper housing portions 12, 14 are matingly secured together in the second orientation, the first and fourth edges 18a, 24b of the lower and upper housing portions 12, 14, respectively, are in contacting relationship with each other, and the second and third edges 18b, 24a of the lower and upper housing portions 12, 14, respectively, are in contacting relationship with each other.

The lower and upper housing portions 12, 14 are preferably secured together in both the first and second orientations via one or more fastening devices. In the illustrated embodiment, threaded bolts 32 (FIG. 3) are configured to be inserted through respective passageways 33 in the lower housing portion 12 and to threadingly engage respective internally-threaded bosses 34 in the upper housing portion 14. However, it is understood that many different fastening devices, including, but not limited to, adhesives, clamps, snaps, flexible latches, and various threaded members, may be utilized to secure the lower and upper housing portions 12, 14 together in the first and second orientations.

Figure 4:
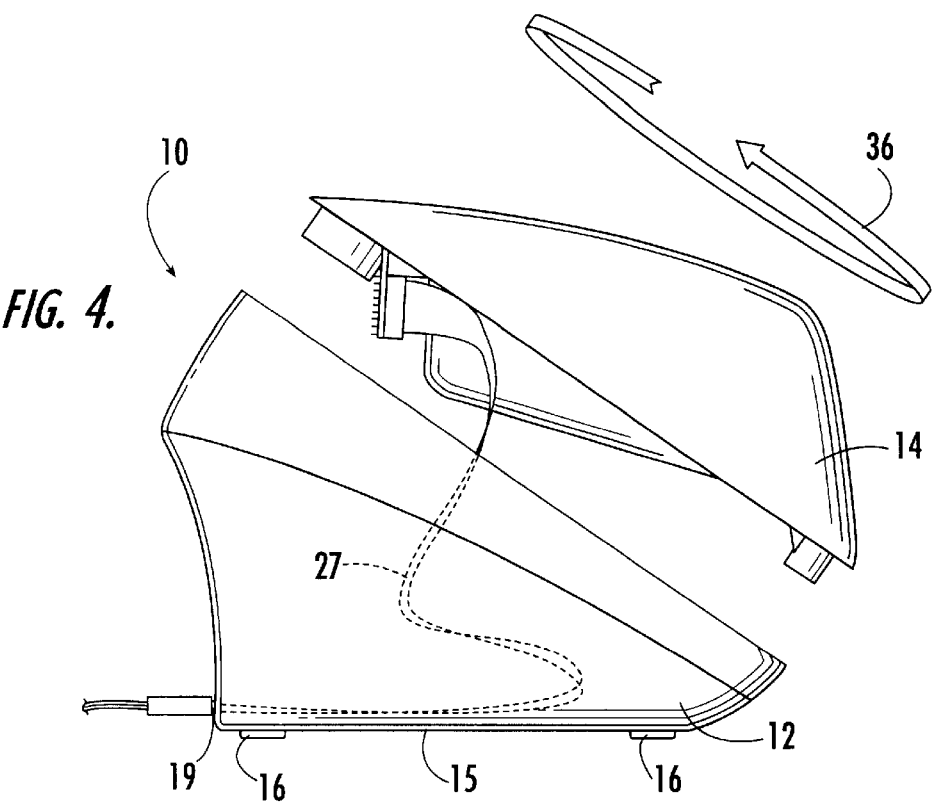
FIG. 4 is an exploded side view of the charging device of FIG. 1 illustrating the upper housing portion being rotated 180° relative to the lower housing portion about an axis normal to the bottom wall of the lower housing portion.

Referring now to FIGS. 3–5, operations for rotating the lower and upper housing portions 12, 14 relative to each other, according to the present invention, are illustrated. In FIG. 3, the threaded bolts 32 are disengaged from the threaded bosses 34 in the upper housing portion 14 and the upper housing portion 14 is lifted up and away from the lower housing portion 12. The upper housing portion 14 is then rotated one hundred eighty degrees (180°) relative to the lower housing portion 12 about an axis normal to the bottom wall 15 as indicated by arrow 36 in FIG. 4. The lower and upper housing portions 12, 14 are then matingly re-secured together in the second orientation and the threaded bolts 32 are re-engaged with the threaded bosses 34, as illustrated in FIG. 5. As illustrated in FIGS. 3–5, the flexible cable 27 allows the lower and upper housing portions 12, 14 to be rotated with respect to each other while maintaining an electrical connection between the electrical terminals 19 and 26.

Figure 7:
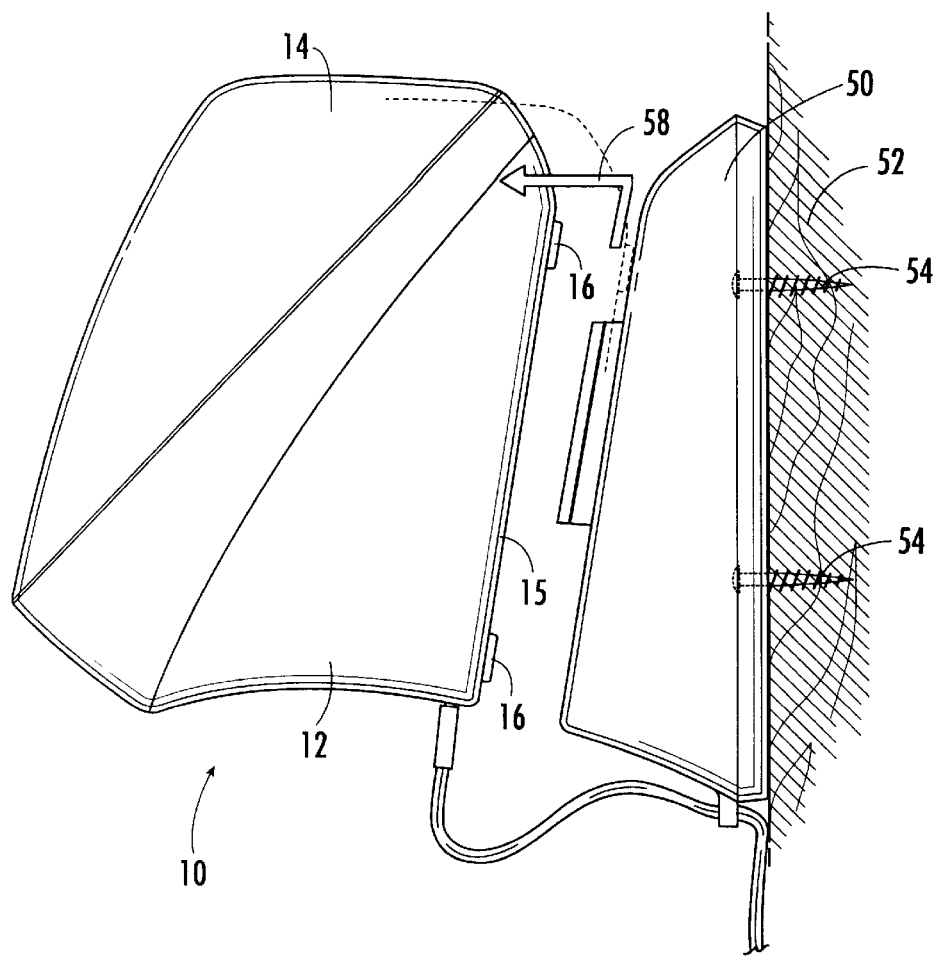
FIG. 7 is a side view of the charging device of FIG. 6 illustrating removal of the charging device from the support bracket.

Referring now to FIGS. 6 and 7, the charging device 10 with the lower and upper housing portions 12, 14 matingly secured together in the second orientation is illustrated with the bottom wall 15 supported in a substantially vertical orientation. A support bracket 50 is mounted to a vertical (or substantially vertical) wall 52 via conventional fasteners (e.g., screws, bolts, nails, and the like) 54. It is understood that the support bracket 50 also may be attached to a vertical wall or substantially vertical wall via various other known methods, including adhesives, clamps and the like. The term "substantially vertical" is intended to mean any surface that defines an angle relative to horizontal of between about forty-five degrees and about one hundred thirty five degrees (45°–135°).

Figure 8:
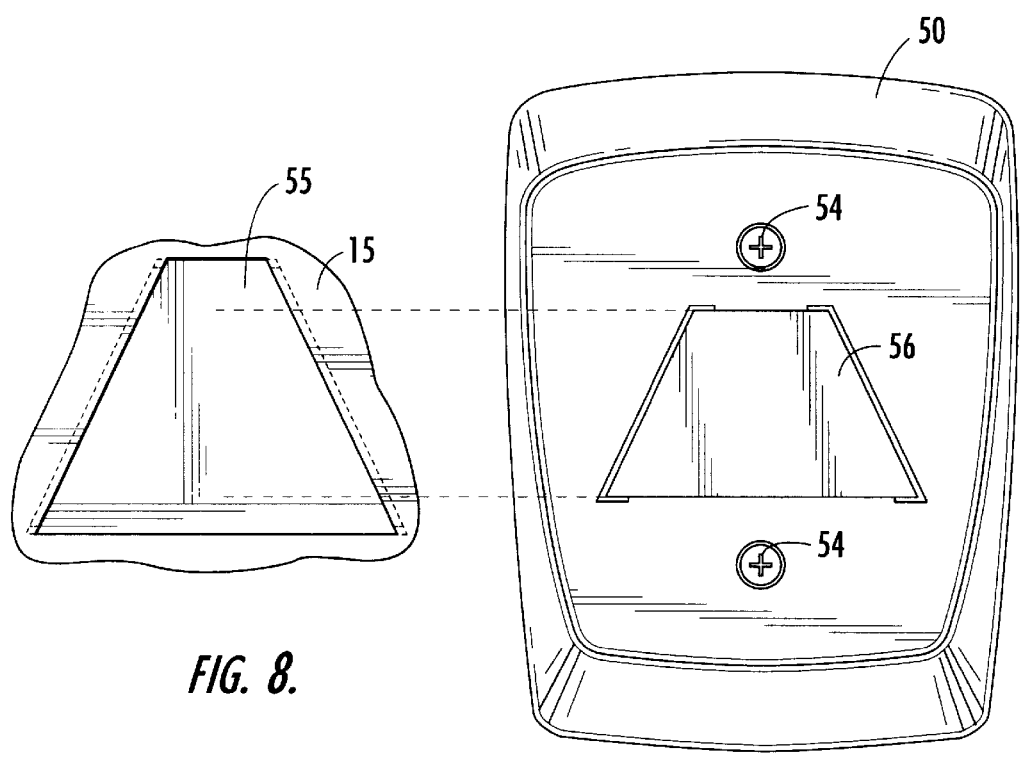
FIG. 8 is a plan view of the support bracket of FIG. 6, and of a recessed portion in the lower housing portion that is adapted to matingly engage a complimentary-shaped member extending outwardly from the support bracket.

Referring now to FIG. 8, the bottom wall 15 of the lower housing portion 12 preferably includes a recessed portion 55 that is adapted to matingly engage a complimentary-shaped member 56 extending outwardly from the support bracket 50 such that the bottom wall 15 is supported in a substantially vertical position (FIG. 6). To secure the charging device 10 to the support bracket 50, the recessed portion 55 is engaged with the complimentary-shaped member 56 and then the lower housing portion 12 is pushed downwardly. To remove the charging device 10 from the support bracket 50, the above process is reversed, as illustrated by arrow 58 in FIG. 7.

It is understood that the recessed portion 55 is not limited to the illustrated shape or configuration. The recessed portion 55 may have virtually any shape or configuration adapted to be matingly engaged with a complimentary-shaped member or with the support bracket 50. Furthermore, the bottom wall 15 may include a member that extends outwardly from the bottom wall 15 and is adapted to matingly engage with a complimentary-shaped recess or member on the support bracket 50. The lower housing portion 12 may also be directly attached to a wall or other vertical or substantially vertical surface with or without the use of a support bracket.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for supporting a wireless communications device, the apparatus comprising:
   a wedge-shaped lower housing portion including a bottom wall; and
   a wedge-shaped upper housing portion comprising a cradle, wherein the cradle is adapted to support the wireless communications device by an end thereof;
   wherein the lower and upper housing portions are adapted to be matingly secured together in a first orientation relative to one another when the bottom wall is supported by a horizontal surface such that the wireless communications device supported within the cradle is maintained at an inclined orientation of between about thirty degrees and ninety degrees (30°–90°) relative to horizontal; and
   wherein the lower and upper housing portions are adapted to be matingly secured together in a second orientation relative to one another when the bottom wall is supported by a vertical surface such that the wireless communications device supported within the cradle is maintained at an inclined orientation of between about thirty degrees and ninety degrees (30°–90°) relative to horizontal.

2. An apparatus according to claim 1:
   wherein the lower housing portion further comprises opposite first and second walls extending upwardly from the bottom wall, and wherein the first and second walls include respective first and second edges that slope away from the bottom wall;
   wherein the upper housing portion further comprises a front wall and opposite third and fourth walls extending rearwardly from the front wall, wherein the third and fourth walls include respective third and fourth edges, and wherein the cradle is disposed within the front wall between the third and fourth walls;
   wherein the first and third edges are in contacting relationship and the second and fourth edges are in contacting relationship when the lower and upper housing portions are matingly secured together in the first orientation; and
   wherein the first and fourth edges are in contacting relationship and the second and third edges are in contacting relationship when the lower and upper housing portions are matingly secured together in the second orientation.

3. An apparatus according to claim 1 further comprising:
   a first electrical terminal in the lower housing portion, wherein the first electrical terminal is adapted to receive electrical power from an external power source; and
   a second electrical terminal in the cradle, wherein the second electrical terminal is adapted to matingly engage with an electrical terminal in the wireless communications device supported within the cradle, and wherein the second electrical terminal is electrically connected to the first electrical terminal.

4. An apparatus according to claim 1 wherein the bottom wall comprises a recessed portion adapted to matingly engage a complimentary-shaped member secured to a vertical surface such that the bottom wall is supported by the vertical surface.

5. An apparatus according to claim 1 wherein the first and second housing portions comprise non-conductive material.

6. An apparatus according to claim 1 wherein the wireless communications device is a radiotelephone.

7. An apparatus according to claim 1 wherein the first and second electrical terminals are electrically connected via an electrical cable.

8. An apparatus according to claim 1 wherein the inclined orientation of the wireless communications device relative to horizontal is the same when the lower and upper housing portions are matingly secured together in both the first and second orientations.

9. An apparatus for charging a battery-powered wireless communications device, the apparatus comprising:
   a wedge-shaped lower housing portion, comprising:
      a bottom wall;
      opposite first and second walls extending upwardly from the bottom wall, wherein the first and second walls include respective first and second edges that slope away from the bottom wall; and a first electrical terminal, wherein the first electrical terminal is adapted to receive electrical power from an external power source; and a wedge-shaped upper housing portion comprising:
a front wall;
opposite third and fourth walls extending rearwardly from the front wall, wherein the third and fourth walls include respective third and fourth edges; and
a cradle disposed within the front wall between the third and fourth walls, wherein the cradle is adapted to support the wireless communications device by an end thereof, wherein the cradle includes a second electrical terminal electrically connected to the first electrical terminal, and wherein the second electrical terminal is adapted to matingly engage with an electrical terminal in the wireless communications device supported within the cradle;

wherein the lower and upper housing portions are adapted to be matingly secured together in a first orientation relative to one another when the bottom wall is supported by a horizontal surface such that the wireless communications device disposed within the cradle is maintained at an inclined orientation of between about thirty degrees and ninety degrees (30°–90°) relative to horizontal; and wherein the lower and upper housing portions are adapted to be matingly secured together in a second orientation relative to one another when the bottom wall is supported by a vertical surface such that the wireless communications device disposed within the cradle is maintained at an inclined orientation of between about thirty degrees and ninety degrees (30°–90°) relative to horizontal.

10. An apparatus according to claim 9:
wherein the first and third edges are in contacting relationship and the second and fourth edges are in contacting relationship when the lower and upper housing portions are matingly secured together in the first orientation; and
wherein the first and fourth edges are in contacting relationship and the second and third edges are in contacting relationship when the lower and upper housing portions are matingly secured together in the second orientation.

11. An apparatus according to claim 9 wherein the bottom wall comprises a recessed portion adapted to matingly engage a complimentary-shaped member secured to a vertical surface such that the bottom wall is supported by the vertical surface.

12. An apparatus according to claim 9 wherein the first and second housing portions comprise non-conductive material.

13. An apparatus according to claim 9 wherein the wireless communications device is a radiotelephone.

14. An apparatus according to claim 9 wherein the inclined orientation of the wireless communications device relative to horizontal is the same when the lower and upper housing portions are matingly secured together in both the first and second orientations.

15. An apparatus for charging a battery-powered radiotelephone, the apparatus comprising:
a wedge-shaped lower housing portion, comprising:
a bottom wall;
opposite first and second walls extending upwardly from the bottom wall, wherein the first and second walls include respective first and second edges that slope away from the bottom wall; and
a first electrical terminal, wherein the first electrical terminal is adapted to receive electrical power from an external power source; and a wedge-shaped upper housing portion comprising:
a front wall;
opposite third and fourth walls extending rearwardly from the front wall, wherein the third and fourth walls include respective third and fourth edges; and
a cradle disposed within the front wall between the third and fourth walls, wherein the cradle is adapted to support the radiotelephone by an end thereof, wherein the cradle includes a second electrical terminal electrically connected to the first electrical terminal via an electrical cable, and wherein the second electrical terminal is adapted to matingly engage with an electrical terminal in the radiotelephone supported within the cradle;

wherein, when the bottom wall is supported by a horizontal surface, the lower and upper housing portions are matingly secured together in a first orientation relative to one another such that the first and third edges are in contacting relationship and the second and fourth edges are in contacting relationship, and such that the radiotelephone supported within the cradle is maintained at an inclined orientation of between about thirty degrees and ninety degrees (30°–90°) relative to horizontal; and wherein, when the bottom wall is supported by a vertical surface, the lower and upper housing portions are matingly secured together in a second orientation relative to one another such that the first and fourth edges are in contacting relationship and the second and third edges are in contacting relationship, and such that the radiotelephone supported within the cradle is maintained at an inclined orientation of between about thirty degrees and ninety degrees (30°–90°) relative to horizontal.

16. An apparatus according to claim 15 wherein the first and second housing portions comprise non-conductive material.

17. An apparatus according to claim 15 wherein the inclined orientation of the radiotelephone relative to horizontal is the same when the lower and upper housing portions are matingly secured together in both the first and second orientations.

* * * * *